(12) United States Patent
Kartalov et al.

(10) Patent No.: US 7,992,587 B2
(45) Date of Patent: Aug. 9, 2011

(54) MICROFLUIDIC AUTOREGULATOR DEVICES AND ARRAYS FOR OPERATION WITH NEWTONIAN FLUIDS

(75) Inventors: Emil Kartalov, Pasadena, CA (US); Axel Scherer, Laguna Beach, CA (US); W. French Anderson, Azusa, CA (US); Christopher I. Walker, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 1064 days.

(21) Appl. No.: 11/606,312

(22) Filed: Nov. 28, 2006

(65) Prior Publication Data

US 2007/0119510 A1 May 31, 2007

Related U.S. Application Data

(60) Provisional application No. 60/740,988, filed on Nov. 30, 2005, provisional application No. 60/764,245, filed on Feb. 1, 2006.

(51) Int. Cl.
*F16K 31/36* (2006.01)

(52) U.S. Cl. .................... 137/505.13; 137/829

(58) Field of Classification Search .......... 137/833, 137/825, 829, 87.04, 87.03, 484.4, 497, 498, 137/500, 505.13
See application file for complete search history.

(56) References Cited

U.S. PATENT DOCUMENTS

| | | | | |
|---|---|---|---|---|
| 4,924,905 A | * | 5/1990 | Mastromatteo | 137/510 |
| 6,814,938 B2 | * | 11/2004 | Karp et al. | 422/504 |
| 2002/0029814 A1 | * | 3/2002 | Unger et al. | 137/824 |
| 2010/0186840 A1 | * | 7/2010 | Kartalov et al. | 137/825 |

* cited by examiner

*Primary Examiner* — Craig Schneider
(74) *Attorney, Agent, or Firm* — Marcus C. Dawes; Daniel L. Dawes

(57) ABSTRACT

By use of the vias a microfluidic autoregulator is fabricated comprising an origin of a fluid, a sink for the fluid, a main flow channel coupling the origin and the sink, a valve communicated to the main flow channel to selectively control flow of fluid therethrough, and means dependent on flow through the main flow channel for creating a pressure differential across the valve to at least partially activate the valve to control flow of fluid through the main flow channel. The means for dependent on flow for creating a pressure differential comprises either a dead-end detour channel from the flow channel to the valve, or a loop channel fed back to the control chamber of the valve.

5 Claims, 6 Drawing Sheets

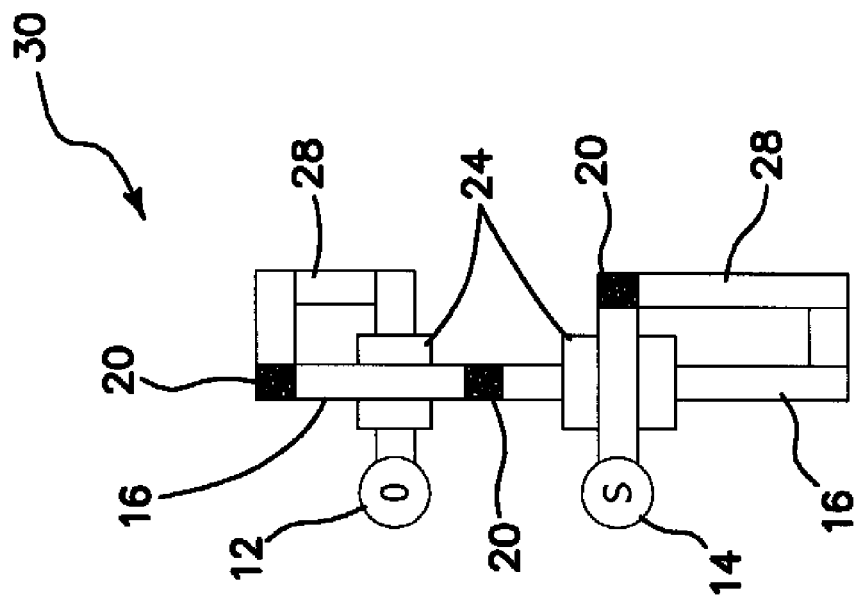
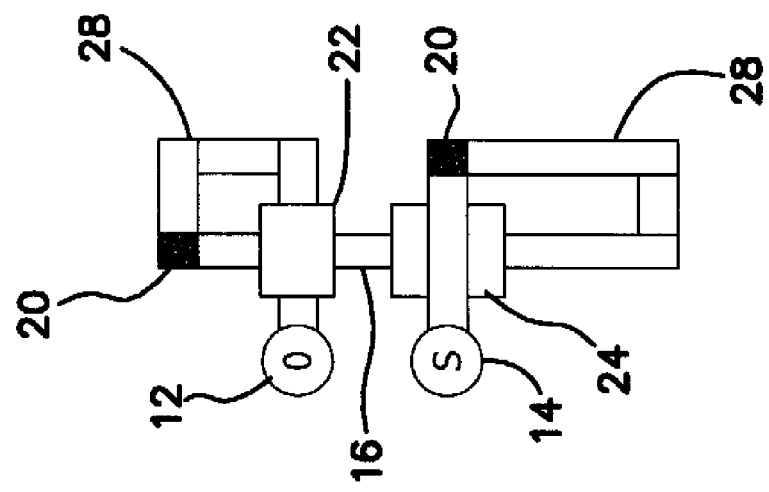
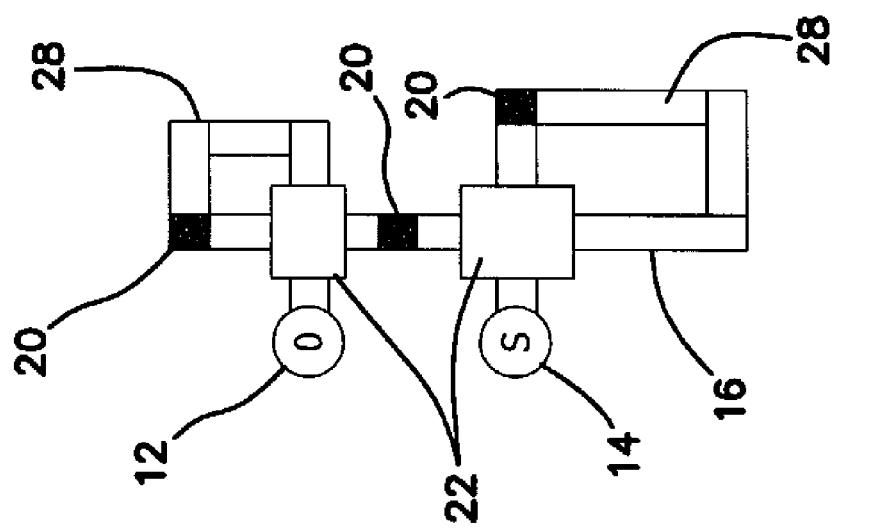

MICROFLUIDIC AUTOREGULATOR DEVICES AND ARRAYS FOR OPERATION WITH NEWTONIAN FLUIDS

RELATED APPLICATIONS

The present application is related to U.S. Provisional Patent Application Ser. No. 60/740,988, filed on Nov. 30, 2005 and Ser. No. 60/764,245, filed on Feb. 1, 2006, each of which are incorporated herein by reference and to which priority is claimed pursuant to 35 USC 119.

The U.S. Government has certain rights in this invention pursuant to Grant No. 1R01 HG002644-01A1 awarded by the National Institutes of Health.

BACKGROUND OF THE INVENTION

1. Field of the Invention

The invention relates to the field of microfluidic devices with nonlinear responses.

2. Description of the Prior Art

Microfluidics is a technology that is establishing itself as an innovative practical tool in biological and biomedical research. Microfluidics offers the advantages of economy of reagents, small sample handling, portability, and speed. PDMS (polydimethylsiloxane) microfluidics in particular also offers industrial up-scalability, parallel fabrication, and a unique capability for complex fluid handling schemes through fluidic networks containing integrated valves and pumps.

Up to now, the configuration of such devices fell into two distinct categories, "pushup" and "pushdown" devices as shown in side cross-sectional view in FIGS. 1a and 1b depending on which direction the microvalve membranes deflected to shut off reagent flow. Both types of devices have advantages and disadvantages, which limit their usefulness in specific applications. For example, pushdown devices are used in applications where the reagents need to access the glass surface of the substrate, e.g. when chips are aligned on top of DNA or protein microarrays printed on the glass substrate. On the other hand, pushup devices allow the practical valving of significantly deeper reagent channels (~40 μm instead of ~10 μm), e.g. in applications involving mammalian cells. It is clear then that none of the available configurations is usable in applications demanding both deep channels and access to the glass substrate, e.g. on-chip mammalian cells expression analysis by printed microarrays. Finally, in both currently available configurations, the reagent flow is restricted to two dimensions, which severely limits the attainable device complexity.

Over the decade of its existence, PDMS (polydimethylsiloxane) microfluidics has progressed from the plain microchannel (1) through pneumatic valves and pumps to an impressive set of specialized components organized by the thousands in multilayer large-scale-integration devices. These devices have become the hydraulic elastomeric embodiment of Richard Feynman's dreams of infinitesimal machines. The now established technology has found successful application in protein crystallization, DNA sequencing, nanoliter PCR, cell sorting and cytometry, nucleic acids extraction and purification, immunoassays, cell studies, and chemical synthesis, while also sewing as the fluid handling component in emerging integrated MEMS (microelectromechanical) devices.

The prior art has developed an ingenious scheme wherein a complex system of multilayer photoresist molds, photoresist pre-masters, and PDMS masters were fabricated and then used in an involved many-step process to produce a 70 μm-thick PDMS layer with 100 μm-wide vertical cylinders connecting 70 μm-tall channels fabricated in thick PDMS slabs. The resulting three dimensional technique was successfully used in protein and cell patterning, but the challenging and labor-intensive fabrication of the devices has largely dissuaded researchers from further work along the same path.

The energetic pursuit of applications however has resulted in a premature attention shift away from fundamental microfluidics. What is needed is a fundamental technological advance that allows a simple and easy access to a large increase in the architectural complexity of microfluidic devices, as well as new possibilities for technical developments and consequent applications.

BRIEF SUMMARY OF THE INVENTION

The illustrated embodiments of the invention employ in their implementation a "via", in analogy to semiconductor electronics and as described in U.S. patent application Ser. No. 11/529,130, incorporated herein by reference. Vias are vertical micropassages that connect channels fabricated in different layers of the same PDMS multilayer chip. The functional result is three dimensional channels that break the restrictions of the traditional architecture wherein channels could never leave their layer and two channels within the same layer could never cross without mixing.

Vertical passages (vias), connecting channels located in different layers, are fabricated monolithically, in parallel, by simple and easy means. The resulting three dimensional connectivity greatly expands the potential complexity of microfluidic architecture. We apply the vias to building autoregulatory devices. A current source is demonstrated, while a diode and a rectifier are derived; all are building blocks for analog circuitry in Newtonian fluids.

By use of the vias the illustrated embodiment of the invention is provided as a microfluidic autoregulator comprising an origin of a fluid, a sink for the fluid, a main flow channel coupling the origin and the sink, a valve communicated to the main flow channel to selectively control flow of fluid therethrough, and means dependent on flow through the main flow channel for creating a pressure differential across the valve to at least partially activate the valve to control flow of fluid through the main flow channel.

The valve has a control port, and in one embodiment the means dependent on flow through the main flow channel for creating a pressure differential across the valve to at least partially activate the valve to control flow of fluid through the main flow channel comprises a dead-end detour channel communicated to the main channel at one end of the detour channel and communicated to a control port of the valve at an opposing end of the detour channel.

In another embodiment the valve has a control chamber and the means dependent on flow through the main flow channel for creating a pressure differential across the valve to at least partially activate the valve to control flow of fluid through the main flow channel comprises a loop in the main channel which loops back through the control chamber of the valve to the sink.

The means dependent on flow through the main flow channel for creating a pressure differential across the valve to at least partially activate the valve to control flow of fluid through the main flow channel comprises means for creating a pressure drop across the valve according to Poiseuille's law.

The autoregulator further comprises a multilayer chip and the valve is provided in one layer of the chip and the main flow channel is defined in an adjacent layer of the chip. A via is also defined between the layers, and in one embodiment the valve is provided in one layer of the chip and the main flow channel is defined in an adjacent layer of the chip. The dead-end detour is defined in the same layer of the chip as the main flow channel and connected to the valve through the via.

In another embodiment the loop is defined in the same layer of the chip as the valve and communicated to the main flow channel through the via.

In still a further embodiment the loop is defined in the same layer of the chip as the main flow channel and communicated to the valve through the via.

The illustrated embodiment of the invention also includes a compound autoregulator array comprising an origin of fluid, a sink of fluid, a first autoregulator with a corresponding first main flow channel, the first autoregulator communicated to the origin, and a second autoregulator with a corresponding second main flow channel, the second autoregulator communicated to the sink and coupled in series with the first autoregulator.

In one embodiment the first and second autoregulators each have a direction of forward flow and are communicated with each other in a face-to-back configuration where forward flow through the first and second autoregulators is in the same direction.

In another embodiment the first and second autoregulators each have a direction of forward flow and are communicated with each other in a back-to back configuration where forward flow through the first and second autoregulators is in opposite directions to each other.

In one embodiment the first and second autoregulators are defined in the same layer of the chip or in a second embodiment are defined in different layers of the chip.

In one embodiment the first and second autoregulators each include a dead-end detour channel communicated to the main flow channel at one end of the detour channel and communicated to the valve at an opposing end of the detour channel.

In another embodiment the first and second autoregulators each include a loop in the main flow channel which loops back through the valve.

The illustrated embodiment also includes a microfluidic rectifier comprising an output channel, two ports and four microfluidic diode arrays, the four microfluidic diode arrays communicated with each other and with the two ports to be configured as a full-wave bridge to provide rectification of fluid flow between the two ports into the output channel.

It is to be understood that the invention contemplates within its scope any combination of autoregulators in all possible logical combinations and all possible topological fluidic circuits.

The invention further contemplates within its scope the method by which each of the above devices, autoregulators or arrays thereof operate.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIGS. 2a-2f are schematic diagrams of various embodiments of compound autoregulator devices devised according to the invention.

Figure 1A:
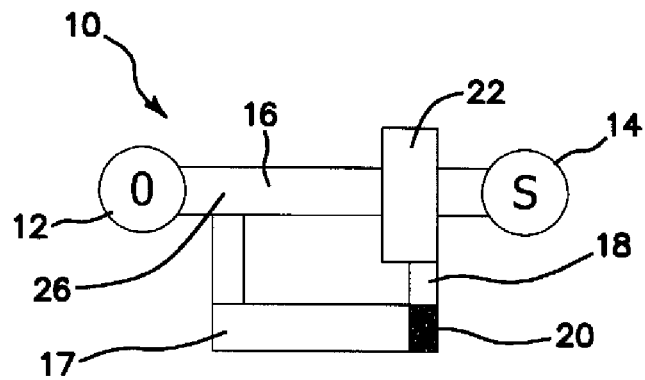
FIGS. 1a-1d are schematic diagrams of various embodiments of autoregulator detour and loop devices devised according to the invention.
Figure 1B:
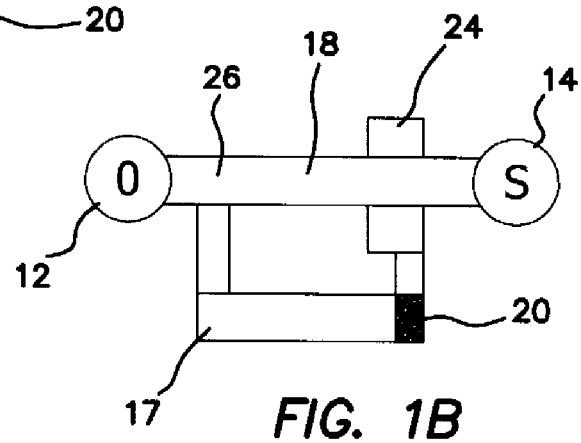
Figure 1C:
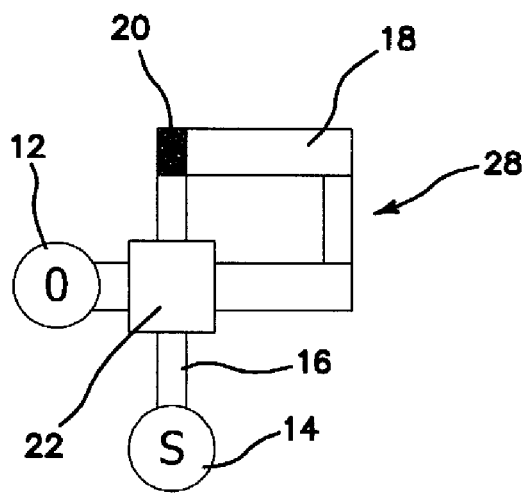
Figure 1D:
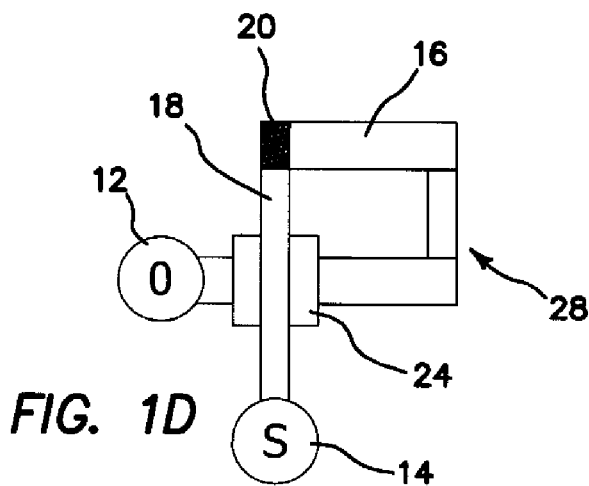

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The future will witness many important advances in patterning, as made possible by the microfluidic via technology presented in the incorporated patent application referenced above. In the multilayer world of microfluidic valves, vias remove the distinction between control and flow channels, because the same three dimensional channel can now be a control channel in one section of the chip and a flow channel in another. Therefore, the same three dimensional channel can act as a control channel upon itself. This feature forms the basis of autoregulatory devices, which are disclosed below. Previous work in microfluidic autoregulation utilized the non-Newtonian rheological properties of concentrated polymeric solutions. By contrast, the invention is the first to show microfluidic autoregulation in Newtonian fluids and thus in environments typical to most microfluidic applications.

While fluidic devices of similarly nonlinearity have been reported in the prior art, those devices can work only in very special non-Newtonian fluids, while the device 10 presented here as well as each of its embodiments and permutations function with Newtonian fluids as well. This characteristic is especially significant as most of the work in microfluidics employs water or aqueous solutions as the universal medium for biological applications.

Herein, we describe a family of new microfluidic devices that have a non-linear response of throughput with applied pressure. That property engenders autoregulation. Primitive autoregulators can then be utilized, modified, and arranged to produce tunable current sources, regenerable fuses, compound autoregulators, microfluidic diodes, and microfluidic rectifiers.

Multilayer PDMS microfluidics has previously been limited to working in planes without fluidic cross connection. The introduction of microfluidic vias as disclosed in the incorporated copending application above offers new possibilities for control. Instead of one layer controlling another by applied pressure in either pushdown or pushup microfluidic devices, vias make it possible that channels control themselves by selectively controlled fluidic connection to another layer.

As a direct embodiment of this novel idea, we have designed a device, generally denoted by reference numeral 10, and various embodiments as shown in FIGS. 1a-1d. Fluid flows from origin 12 to a sink 14 along channels 16 in the upper and/or lower channels 18. The vias 20 connect the channels 16 and 18. The device 10 is referenced as a "detour" device inasmuch a detour is provided from a T connection 26 through a via 20 to a valve 22 or 24 placed in the flow channel 16. The pushdown valve 22 in FIG. 1a or pushup valve 24 in FIG. 1b experiences the same static pressure as the static pressure in the preceding T-junction 26. Simultaneously the channel 16 below valve 22 in FIG. 1a or above the valve 24 in FIG. 1b has lower static pressure due to Poiseuille's law. Poiseuille's law states that the volume flow of an incompressible fluid or of a Newtonian fluid through a circular tube is, equal to $\pi/8$ times the pressure differences between the ends of the tube, times the fourth power of the tube's radius divided by the product of the tube's length and the dynamic viscosity of the fluid. In other words, flowing fluid will exhibit a pressure drop as a function of the volume of flow among other parameters. In other words, within the detour autoregulator device of FIGS. 1a and 1b static pressure decreases from origin 12 to sink 14 as fluid flows along the flow channel 16. Meanwhile, static pressure remains constant along the dead-end detour channel 17 leading to the valve 22 or 24. Therefore, the valve 22 and 24 experiences an effective pressure equal to the static pressure drop between the T connection 26 and the flow channel 16 adjacent to valve 22 or 24. Due to Poiseuille's law and geometry, that pressure drop scales with applied pressure. As the drop increases, the valve membrane (not shown) deforms and constricts the main channel 16. Hence, total resistance increases with applied pressure and the device behaves non-linearly with Newtonian fluids.

The difference in pressure on each side of valve 22, 24 activates the valve 22, 24 to choke the flow of fluid through it. The higher the pressure differential, the more constricted the channel 16 in FIG. 1a or channel 18 in FIG. 1b, the higher the flow resistance. As a result, the device throughput has a non-linear response with applied pressure. In devices 10 of FIGS. 1c and 1d the role of the T-junction 26 is replaced with a loop 28 utilizing the same pressure drop principle communicated with valve 22, 24, while the origin 12 and sink 14 are now in different layers. The loop 28 eliminates the need for a detour channel 17 but requires that the main channel 16 returns to the starting point pressure. Depending on the application or overall device 10, either architecture can be used.

As the applied pressure increases, the pressure difference between the origin 12 and the valve 22, 24 increases as well. That difference produces a force on the membrane of the valve 22, 24 that makes the valve 22, 24 to start closing. The decreased vertical dimension increases the resistance of the segment of channel 16 under the valve 22, 24 and thus the overall resistance of the fluidic device 10 from origin 12 to sink 14. Increased resistance at the same applied pressure means less flow or "current" using an electrical circuit analogy, which also means a smaller pressure drop from the origin 12 to the valve 22, 24 and thus less force on the membrane of the valve 22, 24.

This negative feedback makes throughput flow or "current" increase more slowly than linearly with an increase in applied pressure. Thus the device 10 regulates its own resistance to flow as a hardwired function of applied pressure used in this pressure domain, device 10 acts as an autoregulator.

We constructed a set of detour autoregulator devices 10 of FIG. 1a on the same chip, where the only varying parameter was the main-channel distance X between split and valve. All valves 22, 24 were 100×100 μm, all lower channels were 7×100 μm, and all upper channels were 36×100 μm in lateral dimensions. The length of all main channels was L=14.2 mm. The autoregulator set had X/L={0.80, 0.68, 0.57, 0.46, 0.23}. The 60-μm-square vias 20 were rounded and the PDMS was spun at 5,000 rpm. High-purity water was flowed through each device.

Figure 5A:
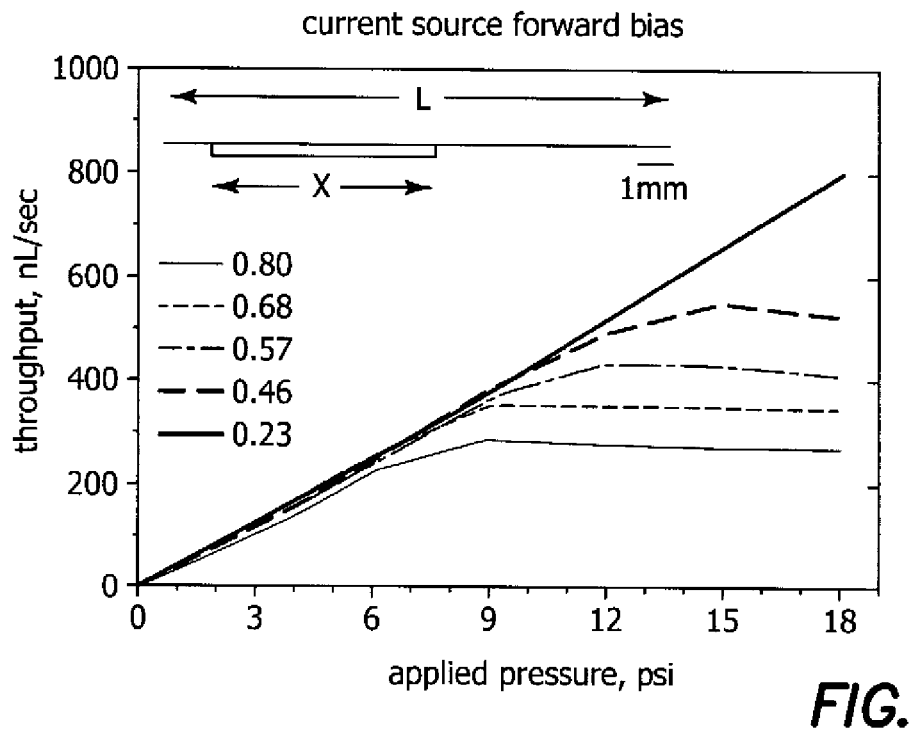
FIG. 5a is a graph of experimental results for the throughput as a function of applied pressure, for a set of detour autoregulators, where the only varying parameter was the main channel distance between T-connection split and valve.

Throughput for the device 10 of FIG. 1a is shown in the graph of FIG. 5a which was measured by timing the advance of the water meniscus in transparent tubing connected to the sink 14. Larger T connection-to-valve distances monotonically correspond to lower saturation points, because identical valves 22 experience larger percentages of the same total applied pressure. These experimental results offer a confirmation of the above qualitative predictions. They also demonstrate that the saturation throughput and saturation pressure of the device 10 can be tuned by varying the split-to-valve length as a percentage of the main-channel length. Hence, these devices 10 can be used as microfluidic current sources with saturation characteristics that are tunable by architectural design.

Figure 5B:
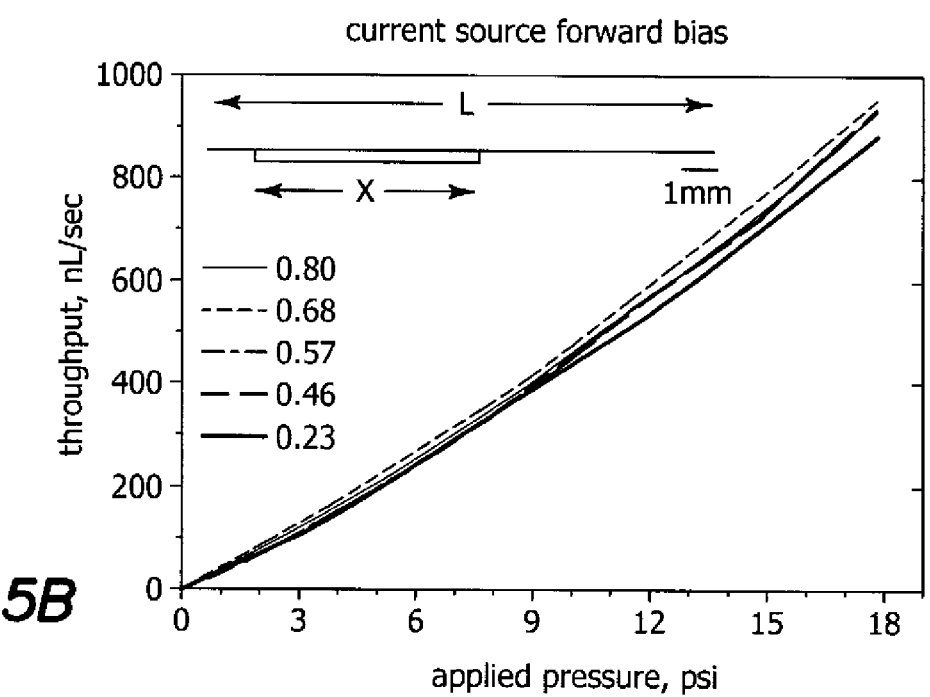
FIG. 5b is a graph of experimental results for the same devices graphed in FIG. 5a which were then reverse-biased by exchanging the roles of origin and sink. In reverse bias, the devices function linearly as plain channels.

The graph of FIG. 5b shows the behavior of the same devices 10 when used in reverse bias. Then, the effective pressure acts on the valve 22 in the opening rather than closing direction and the devices 10 act like plain channels. The small curvature upward in both forward and reverse bias is due to slight dilation of the elastomeric channels 16 at higher pressures and the third-power dependence of throughput on the smaller lateral dimension in Poiseuille's law. In forward bias, a detour (or loop) autoregulator of FIG. 1a, 1b or FIG. 1c, 1d respectively can be used alone as a fluidic current source when operated in its saturation regime.

Due to the third power dependence of flow resistance with the small vertical dimension of the channel 16 in the illustrated embodiment, small changes in the pressure difference produce small changes in the height of the channel 16, but large changes in the flow resistance. Thus a strong stabilization is expected at high pressures. As a result, the derivative of throughput or flow with respect to the applied pressure should approach zero asymptotically at high pressure. In that pressure domain, the device 10 can thus be used as a fluidic current source. Thus, the fabrication parameters determine dimensions which in their own turn tune the saturation flow or "current" as desired.

Up to this point, we have assumed a gradual or quasi-static increase in pressure. If we relax that limitation, pressure pulses are allowed. If in addition we allow for a flabby, sticky PDMS membrane of the autoregulator's valve 22, 24, then a pressure pulse of sufficient magnitude from origin 12 to sink 14 could completely close off the valve 22, 24. At zero flow or throughput, the pressure everywhere between the origin 12 and valve 22, 24 is the same, while the flabby sticky membrane flip will not flick back and open by itself, but latches closed. The result is a microfluidic fuse that shuts off flow when excessive pressure is applied, The fluidic circuit can be reopened by applying a reverse pressure from the direction of the sink 14. Thus the described device 10 functions a regenerable microfluidic fuse.

Figure 2A:
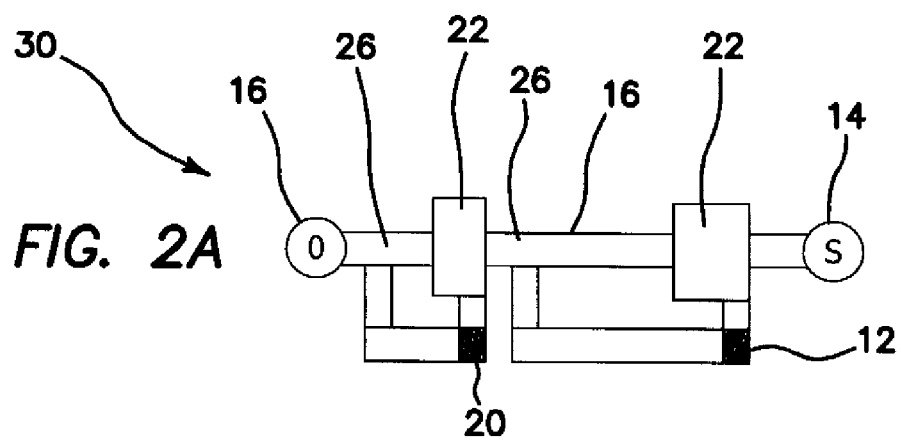
Figure 2B:
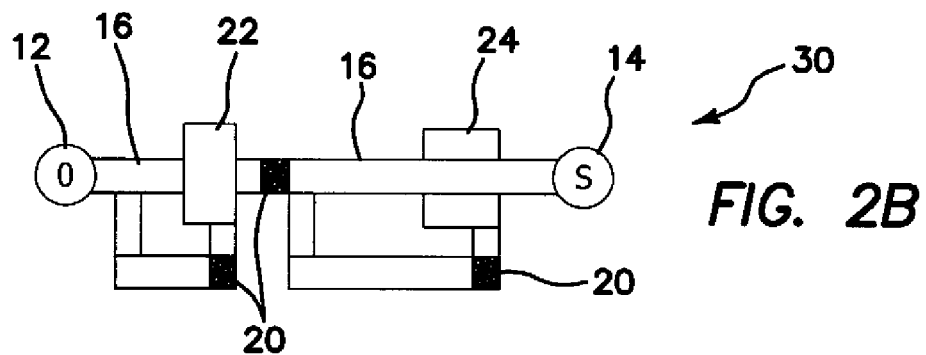
Figure 2C:
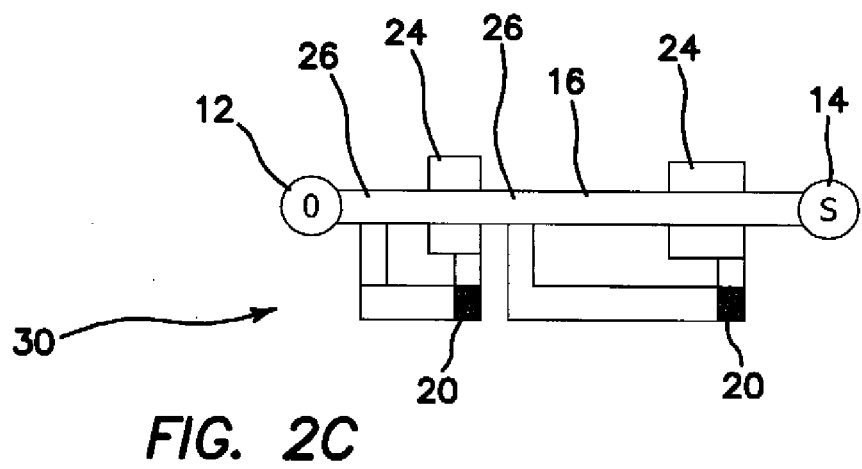

Now that we have described a new microfluidic device 10, a number of architectural permutations become available. For example, a plurality of these devices 10 can be arranged in series and pointing in the same direction to produce a more complex response curve of overall throughput verses applied pressure and that capability significantly expands the space of available tunable behaviors. The resulting device arrays 30 are compound autoregulators, as distinct from the "primitive" or simple autoregulators discussed above. FIGS. 2a-2c show the various permutations of two series communicated devices 10 to form an array 30 each using a feedback T-connection 26 as described in FIGS. 1a and 1b. FIG. 2a is an array 30 in which valves 22 are both pushdown valves. FIG. 2b is an array 30 in which one valves 22 is a pushdown valve and the other valve 24 is a pull up valve. FIG. 2c is an array 30 in which valves 24 are both pull up valves. FIGS. 2d-2f shows three embodiments of two series communicated devices 10 to form an array 30 each using a feedback loop 28 as described in FIGS. 1c and 1d. FIG. 2d is an array 30 in which valves 22 are both pushdown valves. FIG. 2e is an array 30 in which one valves 22 is a pushdown valve and the other valve 24 is a pull up valve. FIG. 2f is an array 30 in which valves 24 are both pull up valves. It must be understood that according to the invention the number of logical combinations can be multiplied by providing the various logical permutations of three or more devices 10 communicated in series and/or parallel arrangements of any combination or circuit topology desired.

If two devices 10 are arranged in opposite directions then what is produced is an overall array 32 that can act as a current source of potentially different saturation currents depending on the direction of the flow. Then each device 10 in the array 32 would act as a current source in its forward bias, and as a plain channel in its reverse bias. The respective saturation points can be made to differ widely by architectural design. For example, the device 10 built around valve 22a would saturate at higher pressure P and throughput T in the 1-to-2 bias than in the 2-to-1 bias of the device 10 built around valve 22b. An appropriately tuned design would ensure different saturation throughputs T in the different directions of applying pressure P as depicted in the graphs of FIGS. 5a and 5b.

Figure 3A:
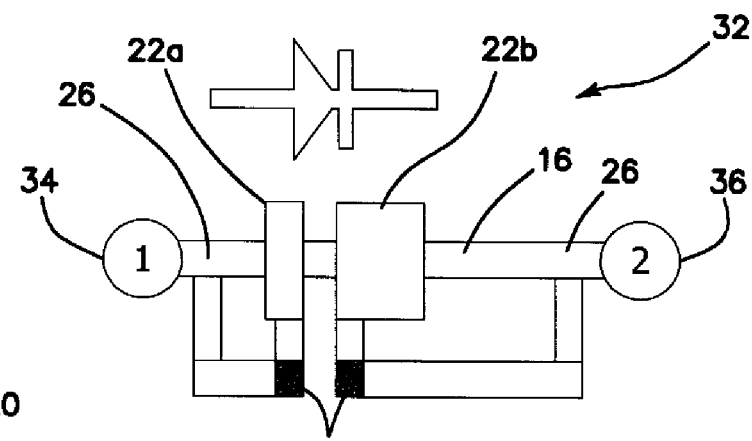
FIGS. 3a and 3b are schematic diagrams of various embodiments of compound autoregulator devices having differing saturation currents and configured to allow large flows or currents in one direction and low flows or currents in the other direction to function like a diode according to the invention.
Figure 3B:
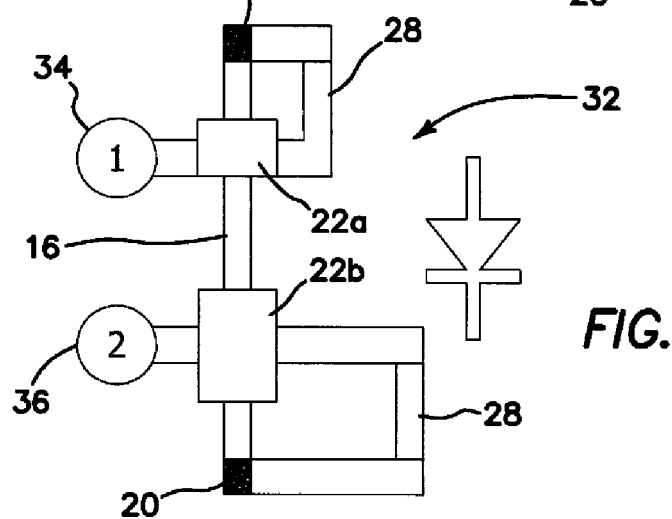
Figure 6:
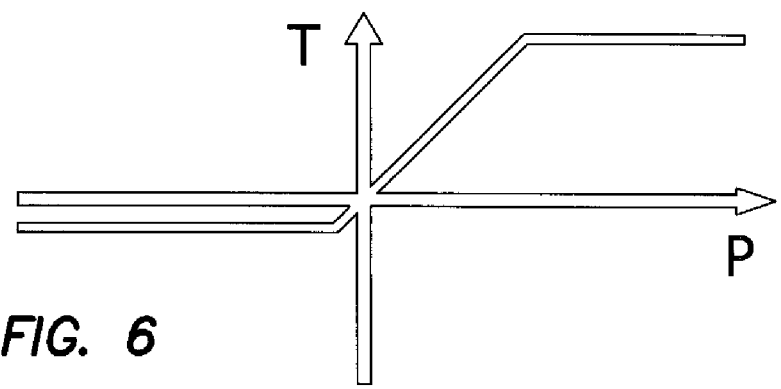
FIG. 6 is an idealized graph of the throughput T as a function of pressure P in the devices of FIGS. 3a and 3b.

Taken to the extreme, such an array 32 with a very low saturation current in one direction, but a very high saturation current in the other direction of flow functions as a microfluidic diode. In such a microfluidic diode, a small tight valve plus a small pressure drop would define a high current in one direction, and a large flabby valve plus a large pressure drop would define the low current direction. FIGS. 3a and 3b illustrate embodiments that utilize pushdown linear and pushdown circular configurations respectively, but the same result can be accomplished by a combination of pushup/pushdown and liner/looping arrays of the type described in FIGS. 2a-2f. In FIG. 3a a linear device 32 is shown in which pushdown valves 22a and 22b are employed using T connections 26. The input/output ports 34 and 36 function either as origins or sinks according to the direction of pressure and flow through device 32. Valve 22a is a small tight valve across which a small pressure drop is arranged. Valve 22b is large flabby valve across which a large pressure drop is arranged. Thus, flow from valve 22a toward valve 22b is a high current or flow direction. Flow from valve 22b toward valve 22a is a low current or flow direction as suggested by the analogous electrical diode polarities shown in the figures. FIG. 6 is a graph which illustrates the idealized throughput function of array 32 as a function of pressure P.

Figure 4:
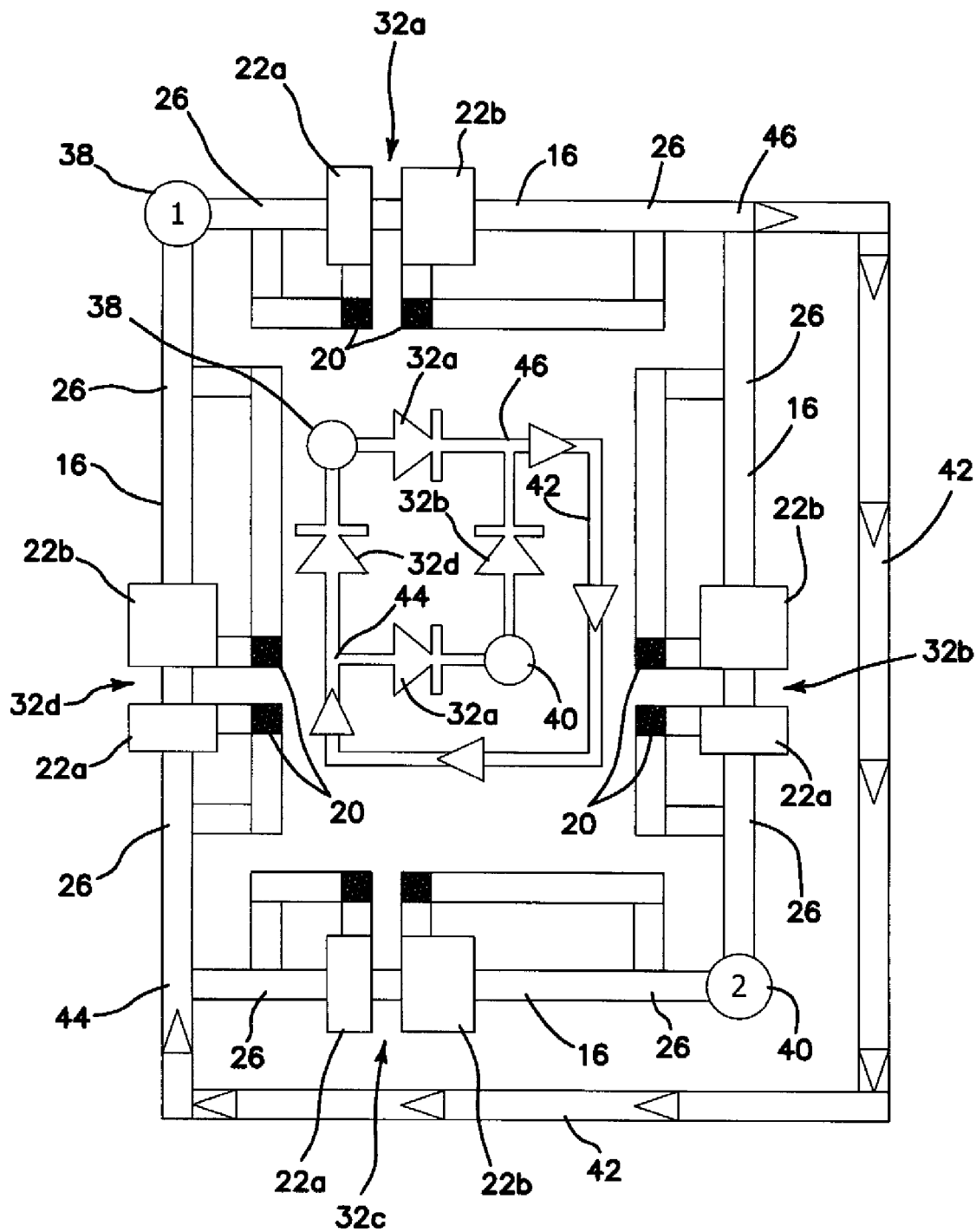
FIG. 4 is a schematic of the embodiment of FIG. 3a used in combination to provide a fluidic full wave rectifier bridge.

The ability to make a microfluidic diode 32 also provides the ability to make any fluidic circuit equivalent to any electrical circuitry utilizing diodes. For example, electrical diodes can be arranged to produce an electrical rectifier, which outputs the same polarity regardless of the polarity of the input. Thus autoregulator fluidic diodes 32 can be arranged to produce a microfluidic rectifier as shown in FIG. 4 in direct analogy with the respectively electrical rectifier circuit schematically shown in the center of FIG. 4. The fluid flows the same direction in the outer channel 42 regardless of choice of origin 12 or sink 14 between ports 38 and 40.

Here four linear fluidic diodes 32a-32d of the type described in FIG. 3a are arranged in a loop and are configured with respect to their high and low flow directions with respect to ports 38 and 40 as are the identically enumerated circuit nodes are in the analogous electrical schematic in the center of FIG. 4. As before, the fluidic circuitry can utilize a combination of pushdown/pushup and linear/looping devices 10 instead of illustrated pushdown valves 22 shown as an example in FIG. 4.

The microfluidic devices 10 and arrays 30 and 32 enhance and expand the capabilities of PDMS microfluidic technology and its scope of applications by providing autoregulation of throughput in Newtonian fluids.

As such, the described overall device is a new type of a microfluidic diode. This diode can be used as a building block to produce more advanced devices, such a microfluidic rectifier bridge, in direct analogy with their electronic counterparts. It is clear that the above devices form the basis of novel microfluidic analog logic with Newtonian fluids.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A microfluidic autoregulator comprising:
   an origin of a fluid;
   a sink for the fluid;
   a main flow channel having a main channel length and coupling the origin and the sink;
   a valve communicated to the main flow channel to selectively control flow of fluid therethrough by continuous partial constriction; and
   means including a loop split from the main channel having a split-to-valve length, the means being dependent on flow through the main flow channel for creating a pressure differential across the valve to partially activate the valve to control flow of fluid through the main flow channel,
   wherein the means comprises controlling the flow of fluid through the main flow channel in a continuous nonlinear response with a statically applied pressure from the origin of the fluid, and
   wherein the valve is characterized by a nonzero saturation flow through the main channel which is tuned by varying the split-to-valve length as a percentage of the main channel length to prevent the valve from completely closing.

2. The autoregulator of claim 1 where the means dependent on flow through the main flow channel for creating a pressure differential across the valve to partially activate the valve to control flow of fluid through the main flow channel comprises means for creating a pressure drop across the valve according to Poiseuille's law.

3. The autoregulator of claim 1 further comprising a multilayer chip and where the valve is provided in one layer of the chip and the main flow channel is defined in an adjacent layer of the chip.

4. The autoregulator of claim 1 where the valve has a control port, and where the means dependent on flow through the main flow channel for creating a pressure differential across the valve to partially activate the valve to control flow of fluid through the main flow channel comprises a dead-end detour channel communicated to the main channel at one end of the detour channel and communicated to a control port of the valve at an opposing end of the detour channel.

5. The autoregulator of claim 4 further comprising a multilayer chip and a via between the layers, and where the valve is provided in one layer of the chip and the main flow channel is defined in an adjacent layer of the chip, the dead-end detour being defined in the same layer of the chip as the main flow channel and connected to the valve through the via.

* * * * *